United States Patent [19]

Kurcbart

[11] Patent Number: 5,265,272
[45] Date of Patent: Nov. 23, 1993

[54] MODULAR WRIST BAND ANTENNA

[75] Inventor: Robert Kurcbart, Boca Raton, Fla.

[73] Assignee: Motorola, Inc., Schaumburg, Ill.

[21] Appl. No.: 743,941

[22] Filed: Aug. 12, 1991

[51] Int. Cl.$^5$ .............................................. H04B 1/06
[52] U.S. Cl. ................................... 455/344; 455/349;
455/269; 343/718; 340/825.44
[58] Field of Search ............... 455/74, 89, 90, 344,
455/128, 347, 349, 269; 343/718; 340/825.44

[56] References Cited

U.S. PATENT DOCUMENTS

| | | | |
|---|---|---|---|
| 4,419,770 | 12/1983 | Yagi et al. ........................... | 455/349 |
| 4,922,260 | 5/1990 | Gaskill et al. ....................... | 343/718 |
| 4,977,614 | 12/1990 | Kurcbart ............................ | 455/351 |
| 5,007,105 | 4/1991 | Kudoh et al. ....................... | 455/344 |

FOREIGN PATENT DOCUMENTS
WO88/05213 7/1988 PCT Int'l Appl. .

Primary Examiner—Reinhard J. Eisenzopf
Assistant Examiner—Almaz Woldu
Attorney, Agent, or Firm—Pablo Meles; William E. Koch; Thomas G. Berry

[57] ABSTRACT

A loop antenna (10) for use in a wrist band radio (50) comprises a series of interconnected links (2 and 4) forming a wristband, a flexible conductor (30) retained between the interconnected links forming the loop antenna, and a connector at the end portions of the series of links for electronically coupling the flexible conductor to the radio.

19 Claims, 3 Drawing Sheets

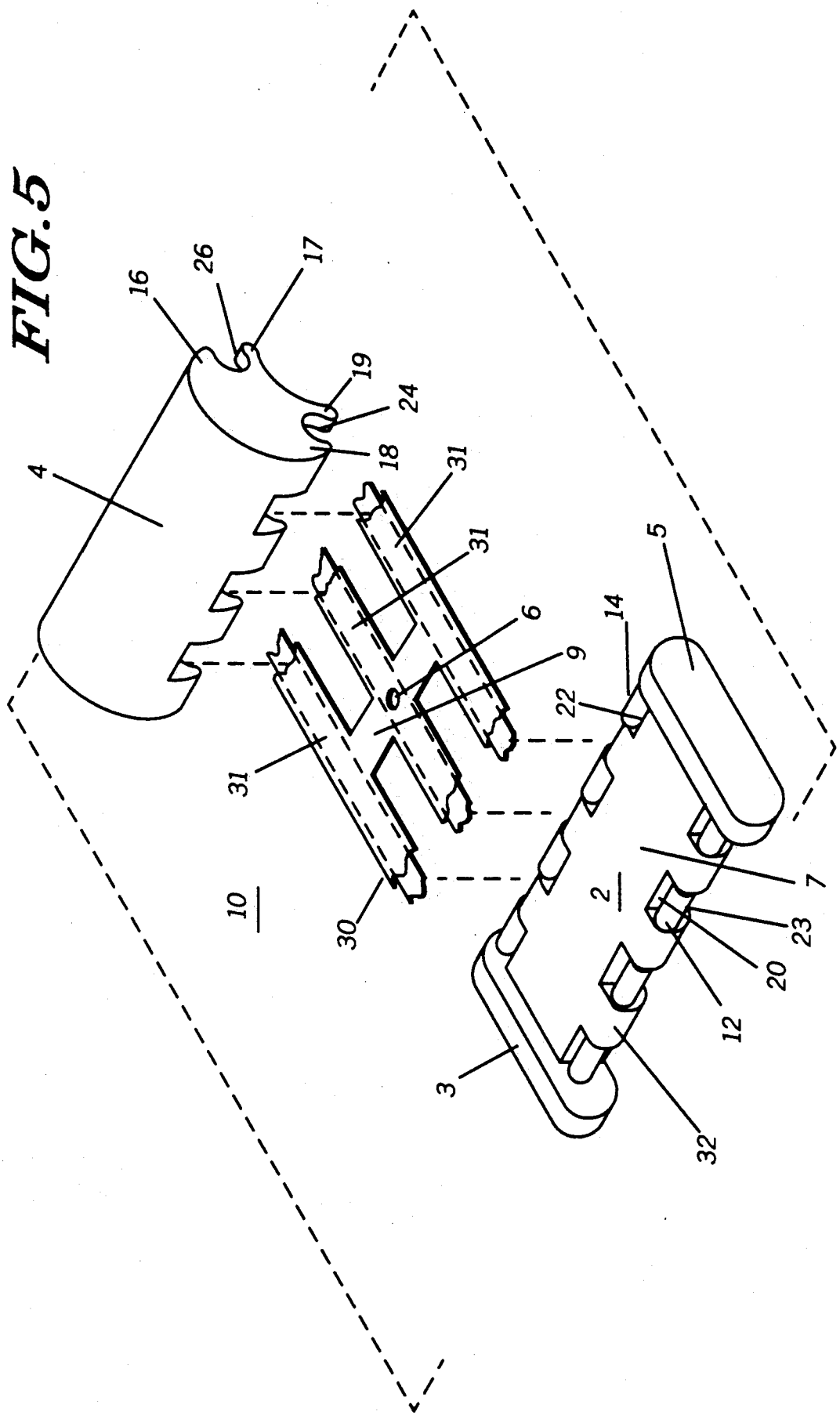

MODULAR WRIST BAND ANTENNA

TECHNICAL FIELD

This invention relates generally to antennas and, more particularly, to wrist band antennas using links.

BACKGROUND

Existing wristband antennas are typically of a fixed length and are not repairable. These antennas are generally molded into plastic or laminated over with plastic. Thus, once the band is broken, the antenna is likely broken and unrepairable. Furthermore, antennas that are laminated or molded into plastic are not free-floating and are subject to greater stresses and strains as the wristband is bent and flexed. Thus, existing wristband antennas reduce the lifespan of the conductor within the wristband. On the otherhand, wristbands using links are repairable and allow for a variety of sizes of wristbands depending on the number of links used. Therefore, a need exists for a repairable wristband antenna that could be incorporated into a wristband using links and further provide stress and strain relief on the conductor.

SUMMARY OF THE INVENTION

A loop antenna for use in a wrist band radio comprises a series of interconnected links forming a wristband, a flexible conductor retained between the interconnected links forming the loop antenna, and connector means at end portions of the series of links for electronically coupling the flexible conductor to the radio.

BRIEF DESCRIPTION OF THE DRAWINGS

FIG. 5 is an exploded perspective view of the modular wristband antenna in accordance with the present invention.

DETAILED DESCRIPTION OF THE PREFERRED EMBODIMENT

Figure 1:
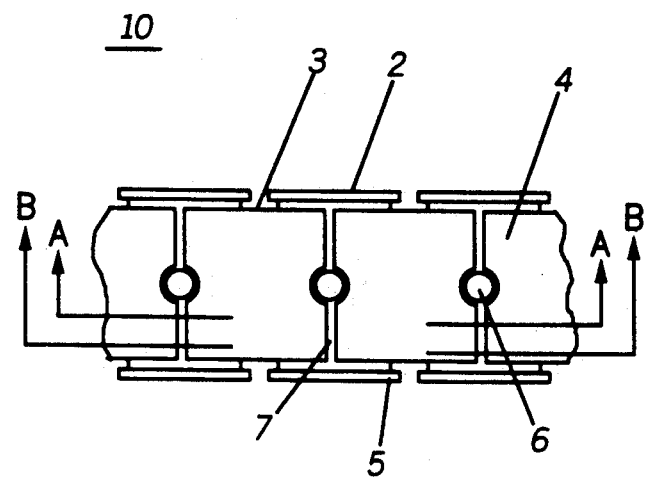
FIG. 1 is a top view of a modular wrist band antenna in accordance with the present invention.
Figure 2:
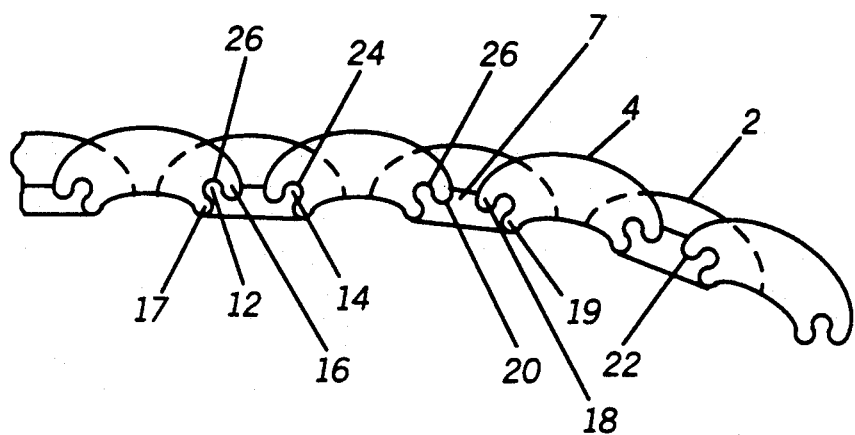
FIG. 2 is a view of section A—A of FIG. 1.

Referring to FIG. 1, there is shown a top view of a modular wristband antenna 10 in accordance with the present invention. The wrist band antenna 10, preferably a loop antenna, comprises a series of interconnected links (such as a bottom link 2 and a top link 4) forming the wrist band. The bottom link 2 preferably includes side portions 3 and 5, coupled by a middle portion 7. Referring now to FIGS. 1-5, the wrist band antenna 10 further comprises a conductor 30, preferably having exposed metal areas 6. The conductor 30 is preferably part of a flex circuit having lamination or having polyimide or polyester film that is sold by Dupont with the names Kapton ® or Mylar ® respectively which surrounds the conductive portions 31. FIG. 2 illustrates how the links are interconnected as viewed from section A—A. The middle portion 7 of bottom link 2 further includes protruding portions 12 and 14 which are integrally formed and recessed in the middle portion 7. The protruding portions 12 and 14 are preferably arranged and constructed to substantially mate with the voids 26 and 24 respectively. The protruding portions 12 and 14 also form concave grooves or voids 20 and 22 respectively for receiving protruding portions 16 and 18 respectively of the top link 4. Likewise, below the protruding portions 12 and 14 exists voids 23 and 25 respectively for receiving protruding portions 17 and 19 of the top link 4.

Figure 4:
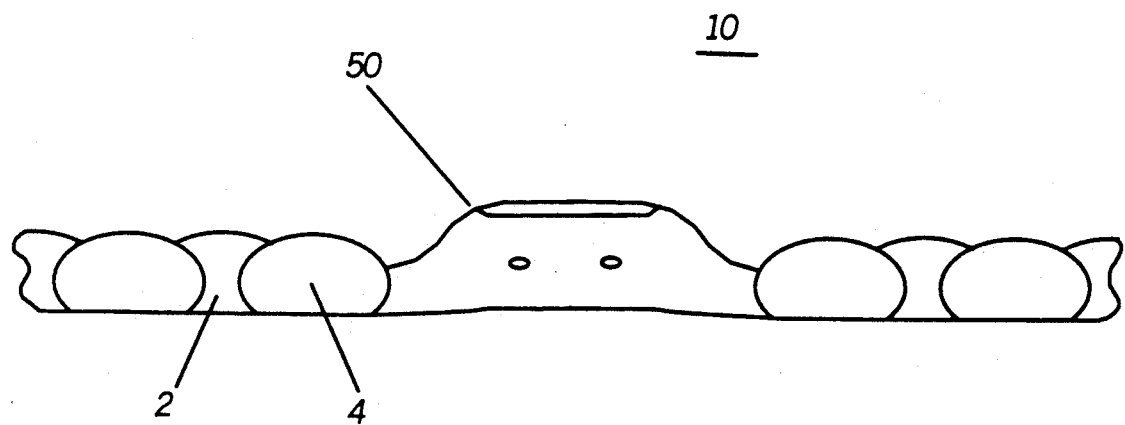
FIG. 4 is a side view of the modular wristband antenna of FIG. 1 with a wristwatch pager in accordance with the present invention.
Figure 3:
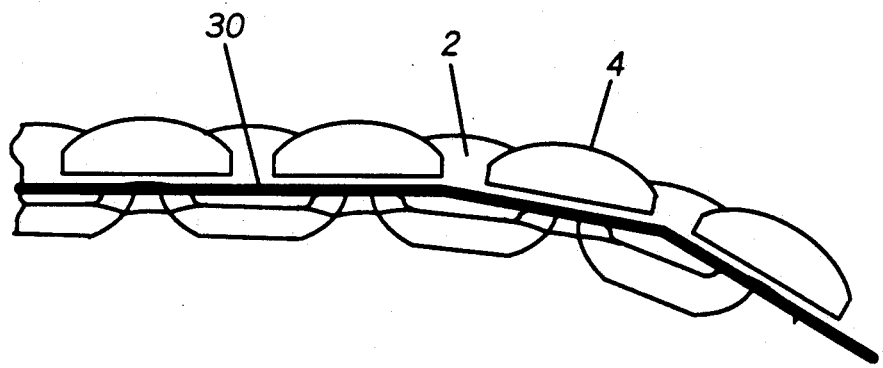
FIG. 3 is a view of section B—B of FIG. 1.

FIG. 3 illustrates the Section B–B cut view of FIG. 1. As shown in FIGS. 3 and 5, the conductor or preferably, the flex circuit 30 runs throughout the length of the wristband. Thus, the use of a particular length of the conductor can be shortened or elongated by adding or removing links from the wristband. As is known in the art, different size antennas provide better reception for particular frequencies or wavelengths. Therefore, due to the frequency requirements of a particular pager or radio, a user would desire a different length antenna. FIG. 4 illustrates a side view of the modular wristband 10 as used with a portable communication device 50 such as a radio or pager.

Operationally, the modular wristband 10 provides voids 20, 22, 23, and 25 in bottom link(s) 2 and voids 24 and 26 in top link(s) 4 so that their respective protruding mating portions (16, 17, 18, and 19 in top link 4 and 12 and 14 in bottom link 2) would be given some play, allowing the wristband to bend and flex. The top and bottom links form a type of snap-fit pivotable ball and joint arrangement as shown. The wristband and consequently the conductor or flex circuit 30 bends and flexes about a neutral line 9. The bending and flexing about the neutral line 9 reduces stresses and strains on the conductor or flex 30. Once the top link(s) 4 is snapped into the bottom link(s) 2, the flex circuit 30 is retained between the two links. The conductive portions 31 preferably lie on the flat planar surface 32 of the middle portion 7 of the bottom link. Thus, the present invention provides a modular wristband antenna using links that further reduces stresses and strains on the conductor (30) by not rigidly retaining the conductor within plastic or lamination.

What is claimed is:

1. A loop antenna for use in a wrist band radio, comprising:
   a series of interconnected links forming a wristband, said series of interconnected links pivoting about neutral lines;
   a flexible conductor retained between the interconnected links forming the loop antenna, said flexible conductor having at least first portions and second portions perpendicular to the first portions, wherein said second portion form the respective neutral lines about which the flexible conductor bends and flexes; and
   connector means at end portions of the series of links for electronically coupling the flexible conductor to the radio.

2. The loop antenna of claim 1, wherein the series of interconnected links snap on to each other, forming a pivotable ball and joint arrangement.

3. The loop antenna of claim 1, wherein the flexible conductor comprises a conductive runner embedded in a flex circuit.

4. The loop antenna of claim 1, wherein said wristband radio comprises a pager.

5. The loop antenna of claim 1, wherein said wristband radio comprises a two-way radio.

6. The loop antenna of claim 1, wherein said wristband is detachable connectable to the wristband radio.

7. An apparatus comprising:

a radio receiver disposed in a housing having two opposed ends;

a wrist band formed from a series of interconnected links, said series of interconnected links pivoting about neutral lines;

a conductor retained between the interconnected links forming the loop antenna, said conductor having at least first portion and second portions perpendicular to the first portions, wherein said second portions form the respective neutral lines about which the conductor bends and flexes; and connector means within the opposed ends of the radio receiver housing and within a first end and a second end of the wrist band for coupling the wrist band to the radio receiver housing forming the loop antenna.

8. The apparatus of claim 7, wherein said radio receiver comprises a pager.

9. The apparatus of claim 7, wherein said apparatus further comprises a radio transmitter forming a two-way radio.

10. The apparatus of claim 7, wherein said apparatus further comprises a watch forming a wrist watch pager.

11. The apparatus of claim 7, wherein said wristband is detachable connectable to the radio housing.

12. The apparatus of claim 11, wherein said connector means comprises snap fit connectors having a male portion on the wrist band and a female portion on the radio housing.

13. The apparatus of claim 12, wherein said connector means comprises snap fit connectors having a female portion on the wrist band and a male portion on the radio housing.

14. A selective call receiver, comprising:

receiver means disposed in a housing;

a wrist band formed from a series of interconnected links, said series of interconnected links pivoting about neutral lines;

a conductor retained between the interconnected links forming the loop antenna, said conductor having at least first portion and a second portions perpendicular to the first portions, wherein said second portion forms the respective neutral lines about which the conductor bends and flexes; and connector means within the opposed ends of the radio receiver housing and within a first end and a second end of the wrist band for coupling the wrist band to the radio receiver housing forming the loop antenna.

15. The selective call receiver of claim 14, wherein said receiver means comprises a pager.

16. The selective call receiver of claim 14, wherein said selective call receiver further comprises a radio transmitter forming a two-way radio.

17. The selective call receiver of claim 14, wherein said links are comprised of plastic.

18. The apparatus of claim 7, wherein the series of interconnected links snap on to each other, forming a pivotable ball and joint arrangement.

19. The select call receiver of claim 14, wherein the series of interconnected links snap on to each other, forming a pivotable ball and joint arrangement.

* * * * *

UNITED STATES PATENT AND TRADEMARK OFFICE
CERTIFICATE OF CORRECTION

PATENT NO. : 5,265,272
DATED : November 23, 1993
INVENTOR(S) : Robert Kurcbart It is certified that error appears in the above-identified patent and that said Letters Patent is hereby corrected as shown below:

Column 2, line 50, delete "portion" and insert --portions--.

Column 3, line 8, delete "portion" and insert --portions--.

Column 4, line 10, after first delete "portion" and insert --portions--.

Column 4, line 12, after second delete "portion forms" and insert --portions form--.

Signed and Sealed this

Twenty-third Day of January, 1996

Attest:

BRUCE LEHMAN

*Attesting Officer*          Commissioner of Patents and Trademarks